US012659096B2

(12) United States Patent
Qi

(10) Patent No.: US 12,659,096 B2
(45) Date of Patent: Jun. 16, 2026

(54) METHODS AND APPARATUS FOR CONFIGURING 5G NEW RADIO UPLINK POSITIONING REFERENCE SIGNALS

(71) Applicant: Samsung Electronics Co., Ltd., Suwon-si (KR)

(72) Inventor: Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 17/594,102

(22) PCT Filed: Apr. 1, 2020

(86) PCT No.: PCT/KR2020/004462
§ 371 (c)(1),
(2) Date: Oct. 1, 2021

(87) PCT Pub. No.: WO2020/204600
PCT Pub. Date: Oct. 8, 2020

(65) Prior Publication Data
US 2022/0182200 A1       Jun. 9, 2022

(30) Foreign Application Priority Data
Apr. 2, 2019     (GB) ..................................... 1904656

(51) Int. Cl.
*H04W 72/04*         (2023.01)
*H04B 7/06*          (2006.01)
              (Continued)
(52) U.S. Cl.
CPC ......... *H04L 5/0048* (2013.01); *H04B 7/0617* (2013.01); *H04W 56/0045* (2013.01); *H04W 72/044* (2013.01)

(58) Field of Classification Search
None
See application file for complete search history.

(56) References Cited

U.S. PATENT DOCUMENTS

| 2020/0092055 A1 * | 3/2020 | Choi | ....................... H04L 5/005 |
| 2021/0352613 A1 * | 11/2021 | Yoon | .................... H04L 5/0092 |
| 2022/0236366 A1 * | 7/2022 | Cha | .................... H04W 72/0453 |

FOREIGN PATENT DOCUMENTS

| KR | 10-2018-0130875 A | 12/2018 |
| WO | 2017200708 A1 | 11/2017 |
| WO | 2019032887 A1 | 2/2019 |

OTHER PUBLICATIONS

International Search Report and Written Opinion of the International Searching Authority dated Oct. 23, 2020, in connection with International Application No. PCT/KR2020/004462, 10 pages.
(Continued)

*Primary Examiner* — Willie J Daniel, Jr.

(57) ABSTRACT

A method of a mobile terminal for transmitting uplink positioning reference signals (UL PRS) to a serving base station and one or more neighbouring base stations in a 5G New Radio mobile communications system. The method comprising: receiving UL PRS configuration information from the serving base station, and transmitting the UL PRS to the serving base station and the one or more neighbouring base stations in accordance with the UL PRS configuration information, wherein the UL PRS configuration information includes an indication of one or more of: a timing advance for the transmission of the UL PRS, a transmission pattern of the UL PRS, a time domain placement of the UL PRS in available UL PRS resources, a quasi-colocation assumption for transmission of the UL PRS, and UL PRS beamforming alignment information.

19 Claims, 12 Drawing Sheets

(51) Int. Cl.
| | |
|---|---|
| *H04L 5/00* | (2006.01) |
| *H04W 56/00* | (2009.01) |
| *H04W 72/044* | (2023.01) |

(56) References Cited

OTHER PUBLICATIONS

International Preliminary Report on Patentability dated Jul. 22, 2021, in connection with International Application No. PCT/KR2020/004462, 4 pages.

Huawei et al., "Considerations on UTDOA in NR," R2-1904101 Resubmission of: R2-1901282, 3GPP TSG-RAN WG2 Meeting #105bis, Xi'an, China, Apr. 8-12, 2019, 5 pages.

Intel Corporation, "Design Aspects for NR UL Positioning," R1-1902512, 3GPP TSG RAN WG1 Meeting #96, Athens, Greece, Feb. 25-Mar. 1, 2019, 13 pages.

Intel Corporation, "Summary for NR-Positioning AI—7.2.10.1.2 UL only based Positioning," R1-1903395, 3GPP TSG RAN WG1 Meeting #96, Athens, Greece, Feb. 25-Mar. 1, 2019, 12 pages.

Supplementary European Search Report dated Apr. 22, 2022, in connection with European Application No. 20783779.0, 15 pages.

Communication pursuant to Article 94(3) EPC dated Jun. 18, 2024, in connection with European Application No. 20783779.0, 11 pages.

Huawei, et al., "Remaining issues on DL & UL positioning," R1-1901576, 3GPP TSG RAN WG1 Meeting #96, Athens, Greece, Feb. 25-Mar. 1, 2019, 9 pages.

Office Action dated Jul. 20, 2025, in connection with Korean Application No. 10-2021-7033433, 14 pages.

CATT, "Further discussion of NR RAT-dependent DL Positioning", 3GPP TSG RAN WG1 Meeting #96, R1-1901980, Feb. 25-Mar. 1, 2019, 31 pages.

\* cited by examiner

Transmit UL PRS in
all beam directions    — 650

Receive UL PRS at the serving gNB
and one or more neighbouring gNBs    — 652

Identifying optimum beams
for reception of UL PRS    — 654

Transmit a beam configuration to the
UE based on the optimum beams    — 656

Transmit UL PRS based on the
received beam configuration    — 658

1200

1300

METHODS AND APPARATUS FOR CONFIGURING 5G NEW RADIO UPLINK POSITIONING REFERENCE SIGNALS

CROSS-REFERENCE TO RELATED APPLICATIONS

This application is a 371 National Stage of International Application No. PCT/KR2020/004462, filed Apr. 1, 2020, which claims priority to United Kingdom Patent Application No. GB1904656.4, filed Apr. 2, 2019, the disclosures of which are herein incorporated by reference in their entirety.

BACKGROUND

1. Field

The present disclosure relates to methods and apparatus for transmitting and receiving positioning reference signals in a 5G New Radio (NR) network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

It is an aim of certain examples of the present disclosure to address the issue of improving the configurability of positioning reference signals in 5G New Radio (NR).

In an exemplary embodiment, the present disclosure there is provided a method of a mobile terminal for transmitting uplink positioning reference signals (UL PRS) to a serving base station and one or more neighbouring base stations in a 5G New Radio mobile communications system, the method comprising: receiving UL PRS configuration information from the serving base station, and transmitting the UL PRS to the serving base station and the one or more neighbouring base stations in accordance with the UL PRS configuration information, wherein the UL PRS configuration information includes an indication of one or more of: a timing advance for the transmission of the UL PRS, a transmission pattern of the UL PRS, a time domain placement of the UL PRS in available UL PRS resources, a quasi-colocation assumption for transmission of the UL PRS, and UL PRS beamforming alignment information.

BRIEF DESCRIPTION OF THE DRAWINGS

Embodiments of the present disclosure are further described hereinafter with reference to the accompanying drawings, in which.

DETAILED DESCRIPTION

Figure 1:
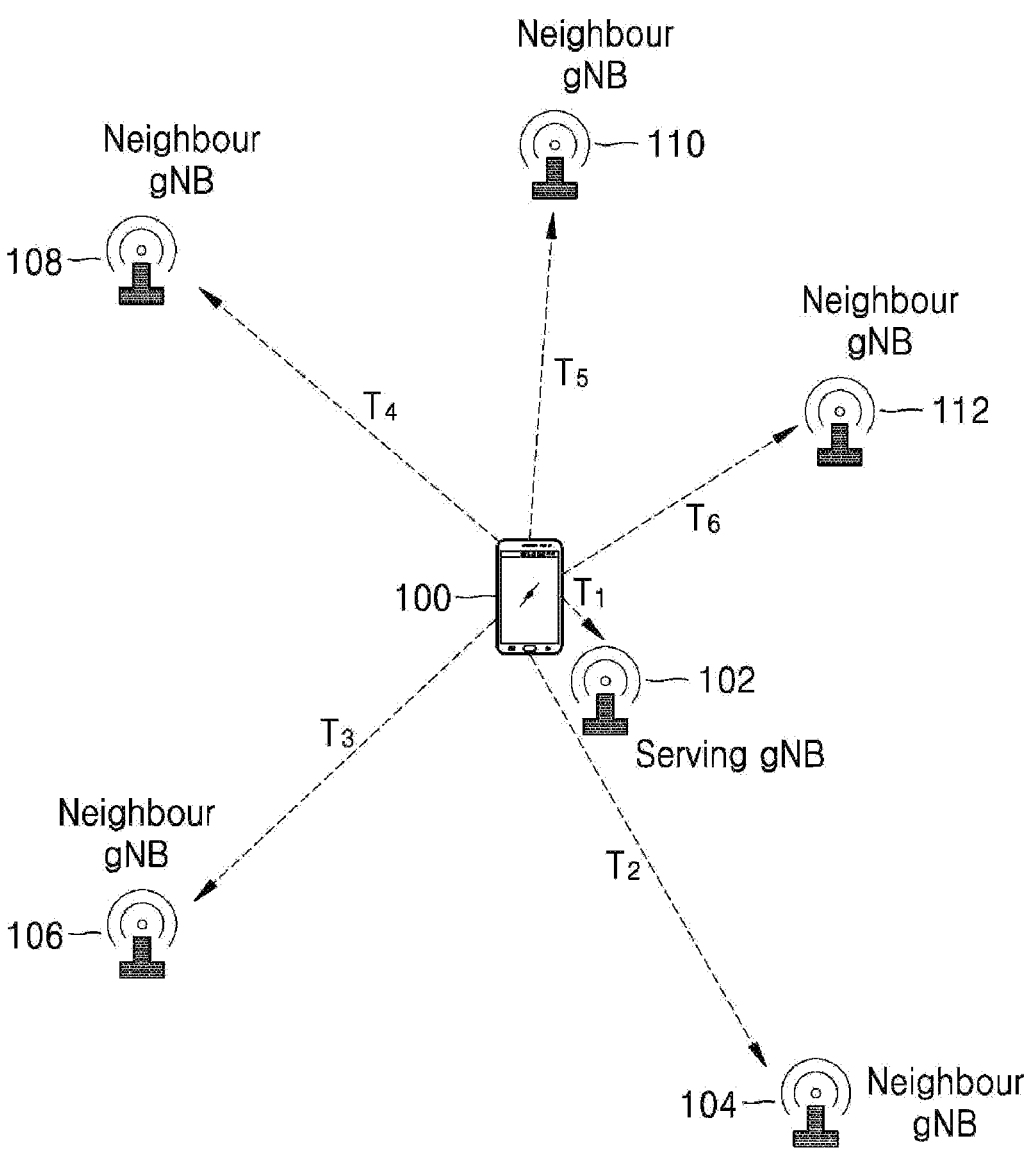
FIG. 1 provides an example geographical arrangement of a user equipment (UE), a serving next generation nodeB (gNB) and a plurality of neighbouring gNBs in a 5G New Radio (NR) mobile communications system.

It is an aim of certain examples of the present disclosure to address the issue of improving the configurability of positioning reference signals in 5G New Radio (NR).

According to a first aspect of the present disclosure there is provided a method of a mobile terminal for transmitting uplink positioning reference signals (UL PRS) to a serving base station and one or more neighbouring base stations in a 5G New Radio mobile communications system, the method comprising: receiving UL PRS configuration information from the serving base station, and transmitting the UL PRS to the serving base station and the one or more neighbouring base stations in accordance with the UL PRS configuration information, wherein the UL PRS configuration information includes an indication of one or more of: a timing advance for the transmission of the UL PRS, a transmission pattern of the UL PRS, a time domain placement of the UL PRS in available UL PRS resources, a quasi-colocation assumption for transmission of the UL PRS, and UL PRS beamforming alignment information.

In an example of the present disclosure one or more timing advances are indicated by the UL PRS configuration information, and the timing advances are based on one of a maximum of the propagation delays between the mobile terminal and the serving base station and the one or more neighbouring base stations, an average of the propagation delays between the mobile terminal and the serving base station and the one or more neighbouring base stations, and a weighted average of the propagation delays between the mobile terminal and the serving base station and the one or more neighbouring base stations.

In an example of the present disclosure the transmission pattern of the UL PRS includes a non-staggered comb pattern, and the UL PRS is transmitted across substantially all the subcarriers of the available UL PRS resources that have been signalled to the mobile terminal by the serving gNB.

In an example of the present disclosure the time domain placement of the UL PRS in the available UL PRS resources is on a pseudo random sequence, wherein a seed used to generate the pseudo random sequence is based on one or more of a mobile terminal ID, a cell ID and a UL PRS resource/resource set ID.

In an example of the present disclosure the UL PRS beamforming alignment information indicates one or more of a plurality of mobile terminal beamforming beams for transmission of the UL PRS to the serving base station and the one or more neighbouring base stations, and transmitting the UL PRS to the serving base station and the one or more neighbouring base stations includes transmitting the UL PRS across the one or more of the indicated beamforming beams.

In an example of the present disclosure transmitting the UL PRS to the serving base station and the one or more neighbouring base stations includes transmitting the UL PRS across all of a plurality of mobile terminal beamforming beams.

In an example of the present disclosure the method further comprises receiving downlink signals from the serving base station and the one or more neighbouring base stations; determining one or more beamforming beams from the plurality of beamforming beams for receiving the downlink signals from each of the serving base station and the one or more neighbouring base stations, transmitting an indication of the determined beams to the serving base station, and transmitting the UL PRS across the one or more determined beams.

In an example of the present disclosure the method further comprises receiving downlink signals from a plurality of base stations other than the serving base station, determining the one or more neighbouring base stations from the plurality of base stations based on a predetermined receive power threshold with respect to the received downlink signals, and transmitting an indication of the one or more neighbouring base stations to the serving base station.

In an example of the present disclosure transmitting the UL PRS across one or more beamformed beams includes transmitting the UL PRS with different transmit powers on two beamformed beams.

In an example of the present disclosure the quasi-colocation assumption includes one or more of: an assumption that downlink positioning reference signals (DL PRS) are quasi-colocated with one or more of a physical downlink control channel (PDCCH), PDCCH demodulation reference signals (DMRS) and a synchronisation signal block (SSB) transmitted by serving gNB in a current timeslot or a last available time slot; an assumption that DL PRS are quasi-colocated with a SSB or channel state information reference signals (CSI-RS) for radio resource management transmitted by a neighbouring gNB in a current timeslot or a last available time slot; an assumption that a same beamforming beam can be used to receive DL PRS, PDCCH, PDCCH DMRS and SSB of a current time slot or a last available time slot when transmitting in the cell served by the serving gNB; an assumption that a same beamforming beam can be used to receive DL PRS and SSB or CSI-RS for radio resource management in a current time slot or a last available time slot and transmit in a neighbouring cell; and an assumption that DL PRS are collocated within each DL PRS block/subset or DL PRS; and an assumption that DL PRS with a same index and in different DL PRS block set/sub-sets are quasi-colocated.

In an example of the present disclosure transmitting the UL PRS includes transmitting the UL PRS with the same beam alignment configuration used to receive DL PRS.

According to a second aspect of the present disclosure there is provided a method of a base station for configuring UL PRS transmissions by a mobile terminal served by the base station in a 5G NR mobile communications system, the method comprising: determining UL PRS configuration information for the transmission of the UL PRS from the mobile terminal to the serving base station and one or more neighbouring base stations; transmitting the UL PRS configuration information to the mobile terminal and the one or more neighbouring base stations; and receiving, based on the UL PRS configuration information, UL PRS transmitted by the mobile terminal in accordance with the UL PRS configuration information, wherein the UL PRS configuration information includes one or more of: a timing advance for the transmission of the UL PRS by the mobile terminal, a transmission pattern of the UL PRS, a time domain placement of the UL PRS in available UL PRS resources, a quasi-colocation assumption for transmission of the UL PRS, and UL PRS beamforming alignment information.

In an example of the present disclosure the method further comprises determining a propagation delay between the mobile terminal and the serving base station and receiving from the neighbouring base stations a propagation delay between each of the neighbouring base stations of the mobile terminal, wherein determining the UL PRS configuration information includes determining one or more timing advances based on one of a maximum of the propagation delays, an average of the propagation delays, and a weighted average of the propagation delays.

In an example of the present disclosure the method further comprises determining a timing window for the reception of the UL PRS at at least one of the serving base station and the one or more neighbouring base stations based on the determined timing advance; and transmitting information the determined timing window to the one or more neighbouring base stations.

In an example of the present disclosure determining the UL PRS configuration information includes determining the time domain placement of the UL PRS in available UL PRS resources on a pseudo random sequence, wherein a seed of the pseudo random sequence is based on one or more of a mobile terminal ID, a cell ID and a UL PRS resource/resource set ID.

In an example of the present disclosure the method further comprises receiving from the mobile terminal an indication of one or more beamforming beams for receiving downlink signals from the serving base station and each of the one or more neighbouring base stations, and wherein determining the UL PRS configuration information includes determining the UL PRS beamforming alignment information based on the indicated one or more beamforming beams.

In an example of the present disclosure the method further comprises receiving an indication of the one or more neighbouring base stations from the mobile terminal.

According to a third aspect of the present disclosure there is provided a method of a neighbouring base station for receiving UL PRS transmissions by mobile terminal served by a serving base station in a 5G NR mobile communications system, the method comprising receiving UL PRS configuration information from the serving base station; and receiving, based on the UL PRS configuration information, UL PRS transmitted by the mobile terminal in accordance with the UL PRS configuration information, wherein the UL PRS configuration information includes one or more of: a timing advance for the transmission of the UL PRS by the mobile terminal, a transmission pattern of the UL PRS, a time domain placement of the UL PRS in available UL PRS resources, a quasi-colocation assumption for transmission of the UL PRS, and UL PRS beamforming alignment information.

In an example of the present disclosure one or more timing advances are indicated by the UL PRS configuration information, and the method further comprises determining a propagation delay between the mobile terminal and the neighbouring base station, and transmitting an indication of the propagation delay to the serving base station, wherein the one or more timing advances are based on one of a maximum of the propagation delays between the mobile terminal and the serving base station, the neighbouring base station, and one or more other neighbouring base stations, an average of the propagation delays between the mobile terminal and the serving base station, the neighbouring base station and one or more other neighbouring base stations, and a weighted average of the propagation delays between the mobile terminal and the serving base station, the neighbouring base station and one or more other neighbouring base stations.

In an example of the present disclosure the method further comprises determining a timing window for receiving the UL PRS transmitted by the mobile terminal based on a propagation delay between the mobile terminal and the neighbouring base station or one more timing advances applied to the UL PRS transmission, and receiving the UL PRS during the determined timing window.

In an example of the present disclosure the method further comprises reducing the transmit power of one or more mobile terminals served by the neighbouring gNB during transmission of the UL PRS by the mobile terminal.

In an example of the present disclosure the method further comprises receiving uplink signals from the mobile terminal, and if the received signal strength of the uplink signals exceeds a predetermined receive power threshold, transmitting an indication to the serving base station indicating that the neighbouring gNB can hear the mobile terminal.

According to a fourth aspect of the present disclosure there is provided a mobile terminal for operation in a 5G New Radio, NR, mobile communications system, wherein the mobile terminal is configured to perform any of the above-described mobile terminal methods.

According to a fifth aspect of the present disclosure there is provided a base station in a 5G New Radio, NR, communications system, wherein the base station is configured to perform any of the above-described base station methods.

According to another aspect of the present disclosure there is provided a computer readable storage medium having stored thereon computer executable instructions which when executed by a computer cause the computer to perform any of the above methods.

Another aspect of the present disclosure provides a computer program comprising instructions arranged, when executed, to implement a method and/or apparatus in accordance with any one of the above-described aspects and relates examples. A further aspect provides machine-readable storage storing such a program.

Wireless or mobile (cellular) communications networks in which a mobile terminal (UE, such as a mobile handset) communicates via a radio link with a network of base stations, or other wireless access points or nodes, have undergone rapid development through a number of generations. The 3rd Generation Partnership Project (3GPP) design, specify and standardise technologies for mobile wireless communication networks. Fourth Generation (4G) systems are now widely deployed.

3GPP standards for 4G systems include an Evolved Packet Core (EPC) and an Enhanced-UTRAN (E-UTRAN: an Enhanced Universal Terrestrial Radio Access Network). The E-UTRAN uses Long Term Evolution (LTE) radio technology. LTE is commonly used to refer to the whole system including both the EPC and the E-UTRAN, and LTE is used in this sense in the remainder of this document. LTE should also be taken to include LTE enhancements such as LTE Advanced and LTE Pro, which offer enhanced data rates compared to LTE.

The trend towards greater data throughput continues with 3GPP currently working to standardise Fifth Generation (5G) network technologies. As part of this, a new air interface is being developed, which may be referred to as 5G New Radio (5G NR) or simply NR. NR is designed to support the wide variety of services and use case scenarios envisaged for 5G networks, though builds upon established LTE technologies. One aspect of NR is the provision of enhanced positioning techniques for determining the positions of both user equipment (UE) and next generation Node Bs (gNBs), where the position of UEs and gNBs is required at least for effective beamforming but also for the provision of location dependent services. Whilst Positioning Reference Signals (PRS) are utilised in LTE and LTE Advanced, the configuration of these PRS is required to be enhanced or new positioning signals defined if the advantages of position-dependent functionality in 5G NR are to be achieved.

Examples in accordance with the present disclosure will now be described in the context of a 5G wireless communication network, and in particular a New Radio (NR) radio access network forming part of a 5G wireless communication network. It will be understood that the present disclosure is not limited to any particular radio access technology. That is, the use of and configuration of Uplink Positioning Reference Signals (UL PRS) or other signals used for position determination at either the UE (i.e. portable terminal/terminal device) side or network side (i.e. base station/gNB) are equally applicable in other wireless communication systems where it is desirable to determine accurate positioning information of a UE and/or base stations such that improvements in system performance and new location dependent functionality can be provided. References to particular 3GPP constructs in certain examples should not be understood as limiting the ability of examples of the present disclosure to be applied to other wireless communication networks.

5G NR Positioning

In 5G NR, and more generally LTE and LTE Advanced systems, approaches to position determination may be separated into three different categories: Radio Access Network (RAN)-dependent techniques, RAN-independent techniques and hybrid techniques, which utilise a combination of the two former techniques in order to complement their operation. RAN-dependent techniques are those that utilise information provided by or derived from signals of the RAN, for example, position information may be determined based on Cell-IDs, E-Cell IDs, Observed Time Difference of Arrival (OTDOA), Uplink Time Difference of Arrival (UTDOA), Angle of Departure (AoD), Angle of Arrival (AoA); and RAN-independent techniques are that utilise information and signals external to the RAN, for example GNSS, Bluetooth, WLAN, Terrestrial Beacon Systems (TB S). From these approaches, there is an effort to improve the capabilities of the RAN-dependent techniques so as to provide increased accuracy position determination, reduced time to fist fix (TTFF) etc. In particular, improved approaches to the use of techniques based upon signal detection and analysis are sought, in other words techniques such as OTDOA, UTDOA, AoD, and AoA. Consequently, there is a requirement for enhancing the configurability of the reference signals used for the RAN-dependent positioning functionality in 5G NR systems.

In LTE and LTE Advanced, RAN-dependent position determination using techniques such as OTDOA, UTDOA, AoD, and AoA are dependent on the receipt of reference signals, or more precisely, Positioning Reference Signal(s) (PRS) in the downlink and Sounding Reference Signal(s) (SRS) in the uplink. These reference signals take the form of pseudo random sequence QPSK signal that is generated based on parameters including one or more of physical layer cell identity, slot number, OFDM symbol number, cyclic prefix, antenna port etc. PRS were introduced in 3GPP LTE Release 9 and therefore further details on PRS can be found in 3GPP TS 36.211 version 9.1.0 Release 9 (30 Mar. 2010). Uplink-based positioning was introduced in 3GPP LTE Release 11, where such positioning is based upon Sounding Reference Signals (SRS), further details on which can be found in 3GPP TS 36.211 version 11.7.0 Release 11 (23 Mar. 2017).

With respect to the uplink, in 5G NR position functionality is to be based on an evolved form of SRS with some preliminary details set out in 3GPP TS 36.211 version 15.4.0 Release 15 (11 Jan. 2019) and 3GPP TR 38.855 Release 16 (19 Dec. 2018).

More specifically, in LTE and LTE Advanced, a UE transmits SRS to an eNB for the purposes of uplink channel estimation, timing estimation etc. The SRS may be classified as single, periodic, or aperiodic. In 5G NR the SRS may be used as a starting point for the operation of uplink PRS, although it would be desirable that uplink PRS (UL PRS) in 5G NR has number of enhancements compared to LTE SRS in order enhance the functionality and operation of the reference signal transmissions. Details of LTE SRS can be found in 3GPP TS 36.211 Release 11 version 11.7.0 (23 Mar. 2017).

More recently, in view of discussions concerning 3GPP Release 16, consideration of positioning accuracy (including latitude, longitude and altitude), availability, reliability, latency, network synchronization requirements, UE/gNB complexity to perform positioning, synergy with existing positioning support for E-UTRAN of approaches are required when attempting to address the requirements set out in TR 38.913 Release 15 version 15.0.0 (19 Jul. 2018), TS 22.261 Release 16 version 16.6.0 (28 Dec. 2018), TR 22.872 Release 16 version 16.1.0 (21 Sep. 2018) and TR 22.804 Release 16 version 16.2.0 (21 Dec. 2018). Furthermore, solutions to these requirements should take into account a number of specified constraints. For example, positioning techniques should preferably be able to function in both 5G NR frequency ranges of FR1 (450 to 6000M Hz) and FR2 (>6 GHz/24250 to 52600 MHz), and be configurable so that they may operate over the many different network configurations that are envisaged in 5G NR systems. For example, positioning techniques should operate at the minimum 5G NR bandwidth of 5 MHz but be scalable to higher bandwidths; they should be applicable to Internet of Things (IoT) devices, and also support voice and data devices; they should be efficient and low complexity for the various use cases whilst preferably using a common architecture where possible. Given these desired requirements, positioning techniques with a large degree of configurability are required for 5G NR.

Additionally, 5G NR is required to operate in a broad range of different scenarios, for example, indoor, outdoor, line-of-sight, non-line-of-sight, short-range, and long-range. Each of these scenarios have markedly different characteristics in terms of channels, bandwidth, frequencies, use cases etc., and therefore, as well as their positioning requirements varying, the configurations needed to provide the required level of positioning functionality will also vary. For example, the differing channels such as Urban Micro (UMi), Urban Macro (UMa), Rural Macro etc. will likely require different configurations of PRS. Consequently, the characteristics of PRS will be required to be configurable to these different scenarios. Likewise for example, in scenarios where a UE is distant to the gNB, transmission power of the positioning signals should be increased; in scenarios with a high degree of interference, a lower-density of signals may be required for orthogonality between PRS; and in scenarios where low latency in required, signals used for positioning may be transmitted more frequently.

Different scenarios may also include the type of devices that are being used. For example, low bandwidth devices (i.e. those with a small bandwidth part (BWP)) may require positioning signals to be transmitted in a narrow bandwidth. Likewise, devices that operate with differing OFDM sub-carrier spacings (SCS) may also require specific arrangements of positioning signals in frequency and time. Different scenarios may also have various requirements in terms of overheads and spectral efficiency and therefore PRS may also be required to be configured based on these requirements.

As set out above, numerous different approaches may be used to determine the position of a UE in 5G systems. However, uplink time difference of arrival (UTDOA) is likely to be commonly used in conjunction with UL PRS. UTDOA of arrival operates by measuring the difference in arrival times between uplink reference signals (e.g. UL PRS) received at multiple gNBs from a UE. For example, the arrival time of reference signals at three gNBs from a UE will be measured. The arrival times may then be transmitted to the serving gNB which can calculate the position on of the UE based on upon the received measurements and its own location information using a hyperbolic multilateral algorithm for example.

Various approaches to addressing the uplink positioning requirements of 5G NR networks are set out below.

UE Timing Advance

In LTE and 5G NR systems, a timing advance (TA) may be applied to uplink transmissions from a UE in order to compensate for signal propagation delays so that transmissions from different UEs within a cell are synchronised when received at the serving gNB. Therefore, UEs which are further from a gNB will apply an increased timing advance compared to UEs closer to the gNB. Usually in 5G NR, the TA is relative to a downlink frame and is twice the propagation delay between the UE and gNB (plus an adjustment factor in some examples) in order to take account of both the downlink and uplink propagation delay, presuming that they can be considered to be equivalent, where the TA is configured by the serving gNB, is UE specific, and is provided to the UE by the serving gNB by upper or lower layer signalling.

Conventionally, given that timing advances are configured by the serving gNB, a UE is expected to receive only one TA value, as the UE transmissions are generally intended only for the serving gNB. However, in UL positioning, UL PRS are intended to be heard not only by the serving gNB but also by as many neighbouring gNBs as possible, so that UTODA can be performed. Due to this, as FIG. 1 illustrates, numerous different propagation delays T1-T6 may apply to a single UL PRS transmission that is intended to be received by a serving gNB 102 a plurality of neighbouring gNBs 104-112.

As shown in FIG. 1, some of the neighboring gNBs may be at significantly different distances from the UE (e.g. at a significantly further distance than the serving gNB). Consequently, for those neighboring gNBs using TA values configured by the serving gNB an arrival time gap between UL PRS and signals from other UEs associated with the neighboring gNB may occur due to the different propagation delays. Such misalignment will likely cause interferences at neighbouring gNBs between UL PRS and the local signals from their own associated UEs.

Normally, a cyclic prefix (CP) may be used to compensate for this arrival timing gap. However, currently proposed CP lengths are mainly targeted at the serving cell and thus determined by cell size, for example, a CP may cover up to a 700 m UE-gNB distance with 15 kHz subcarrier spacing. Such a CP may for example not be enough since for UMa scenario, the gNBs on the second tier need to hear the UL PRS from the UE and the distance between second tier gNB and UE can be up to 1000 m. Although a solution may be to extend the CP duration for UL PRS, an extended CP duration will reduce the spectrum efficiency and is therefore not desirable.

Figure 2:
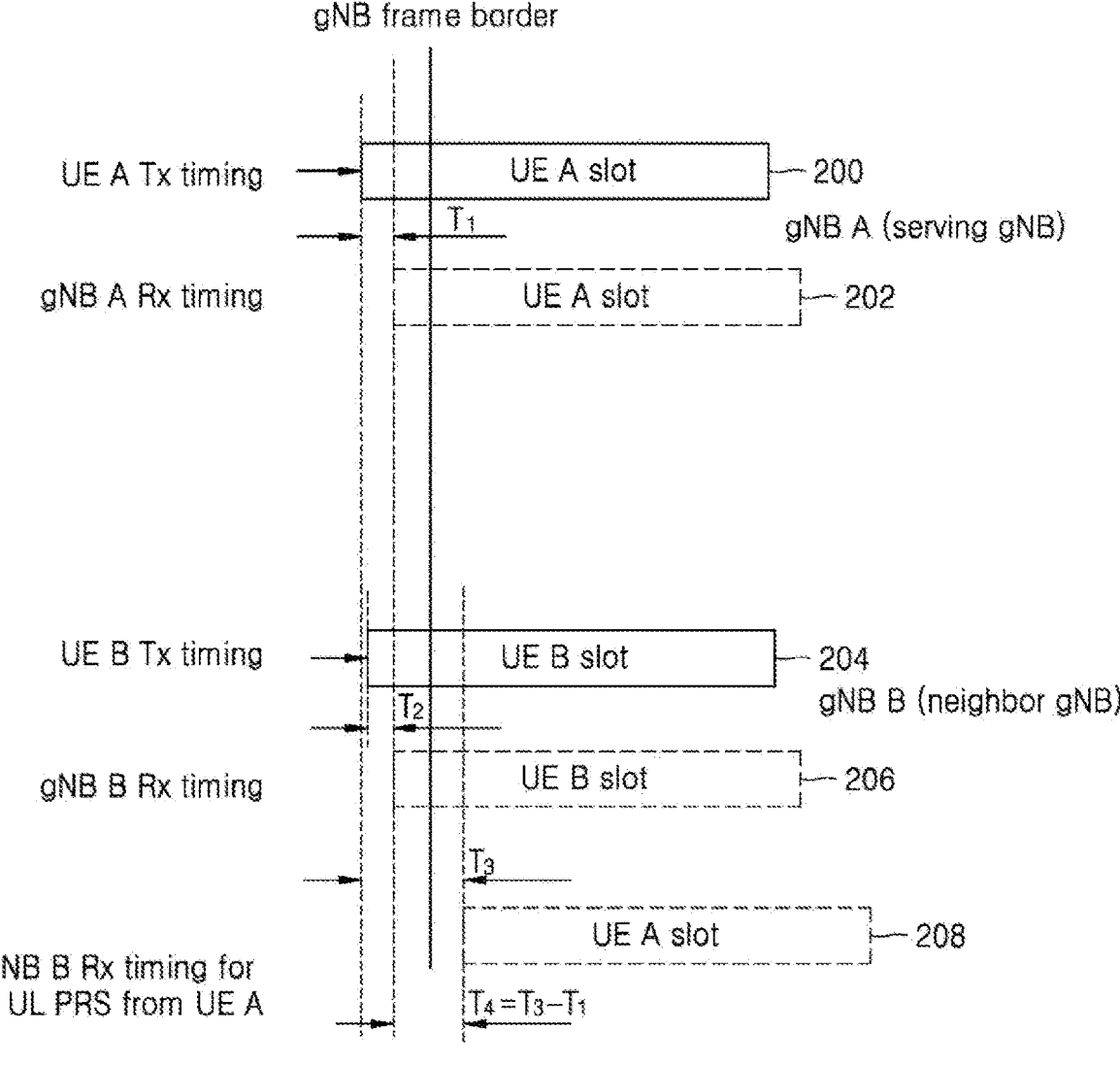
FIG. 2 provides example time advances and measurement slots of a serving gNB and a neighbouring gNB.

FIG. 2 provides example time advances and measurement slots of a serving gNB and a neighbouring gNB.

This problem is illustrated in FIG. 2, where T1 is the propagation delay from UE A to the serving cell gNB A, and 200 and 202 illustrate the timing of the transmission and reception slots of UE A at the UE and gNB A respectively. T2 is the propagation delay from UE B to its serving cell gNB B and 204 and 206 illustrate the timing of the transmission and reception slots of UE A at the UE and gNB B respectively. T3 is the propagation delay of the UL PRS from UE A to its neighbor cell gNB B and T4 is the arrival timing gap equal to T3–T1. As set out above, the time T–4 may be too large to be accounted for by a CP. In other words, the timing of the reception slot 208 of UE A transmission at gNB B is significantly different to the slot 206 and thus adjustment of the measurement/timing window of gNB B will be required.

In order to account for the aforementioned problems concerning timing advances, CPs and UL PRS, a number of different approaches may be taken, each of which is explained below.

In accordance with a first approach to addressing the issue of varying propagation delays/TAs, the UE's TA is configured as normal by the serving gNB but the measurement window of the neighbouring gNB may be adjusted in order to allow reception of the UL PRS transmitted by the UE.

The measurement window of gNB B may be adjusted in a number of different manners:

1) A neighbouring gNB (i.e. gNB B) may align its measurement window with UE A slot 208, e.g. the measurement window is postponed by T4. Although this adjustment may have an impact on local signal reception from UE B, gNB B may configure UE B to be muted during this measurement window.

2) A neighbouring gNB may align its measurement window with the middle timing of UE B slot 206 and UE A slot 208 e.g. the measurement window is postponed by a fraction of T4. In this case, both reception of UL PRS from UE A and local signals from UE B at gNB B will be affected but some interference cancelling mechanisms can be applied in order to reduce any adverse effects that arise.

3) A sliding measurement window may be defined and flexible adjustment can be employed for the measurement timing, where the widow may be dynamically adjusted based on local information of the neighbouring gNB and/or information received from the serving gNB of the UE of interest. Although interference may again result from such an approach, interference cancelling mechanisms may be applied in order to reduce any adverse effects.

Each of these three approaches are at least partially reliant on knowledge of timing value T3. The value of T3 may be acquired by an Rx-Tx timing difference measured by gNB B and Rx-Tx timing difference measured by UE A, where information on the UL PRS configuration and Rx-Tx timing difference measured by UE A may be required to be exchanged between the serving gNB and the neighbouring gNB in order to facilitate the calculation of the value of T3. Alternatively, the value of T3 may be measured using PRACH transmissions from UE A. Furthermore, for each of the three approaches, the measurement adjustment may be configured by upper layer signalling e.g. LTE positioning protocol (LPP), radio resource control (RRC) etc.

In accordance with a second approach, a single TA value can be configured by the serving gNB but the TA value may be based on not only the propagation delay between UE A and gNB A but also the propagation delay between UE A and the one or more neighbouring gNBs. For example, the TA may be based one of the following, where N is the total number of gNBs that can hear the UL PRS transmitted by UE A and each TA1 . . . N is the TA required if each of the gNBs were to be the serving gNB of the UE.

A maximum propagation delay between UE A and each of the neighbouring gNBs: TA=max{TA1, TA2, . . . TAN}.

An average (e.g. mean, mode or media) propagation delay between UE A and each of the neighbouring gNBs: TA=average{TA1, TA2, . . . , TAN}

A weighted average of the propagation delay between UE A and each of the neighbouring gNBs: TA=weighted average of {TA1, TA2, . . . , TAN}.

For each of these proposed methods for calculating the single TA value, the identity and number of the neighbouring gNBs that can hear the UE will be required. In one example, this may be achieved by setting a receive power threshold with respect to the receipt of PRACH from the UE such that if the received UE PRACH signal is received is above the threshold, the gNB is inserted into the list of gNBs to be considered. The TA values from the different gNBs may also be required to be exchanged such that the above-mentioned equations can be calculated.

In 5G NR multiple UL PRS resource/resource sets may be configured. For example, UL PRS resources may be formed into sets e.g. K resources within the range 1 to 64. One resource set can be within one slot/subframe or across multiple slots/subframes. The number of UL PRS resources within one resource set may scale with carrier frequency, numerology, bandwidth, etc., and a resource set may be non-consecutive so as to be multiplexed in time domain. In other words, within one resource set, the same or different PRS patterns can be configured to different PRS resources. Therefore, different TAs may be configured for each of the resources/resource sets. Given this flexibility, different TA values can be configured to UL PRS in the time domain as shown in FIG. 3.

Figure 3:
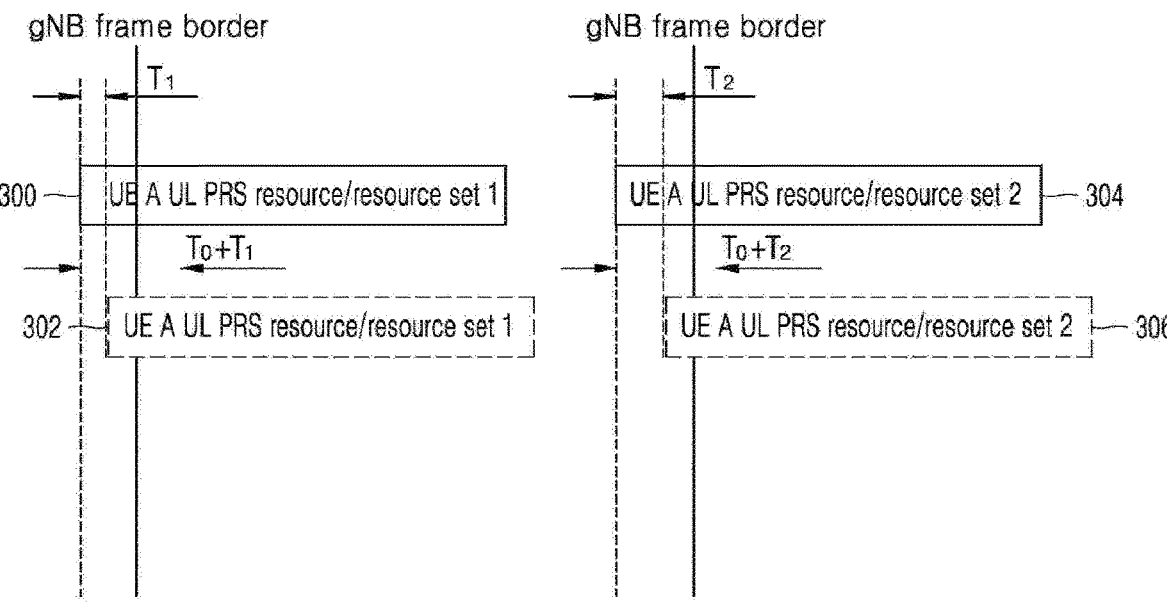
FIG. 3 illustrates a configuration of timing advances for different uplink positioning reference signals (UL PRS) resource sets in accordance with an example of the present disclosure.

FIG. 3 illustrates a configuration of timing advances for different uplink positioning reference signals (UL PRS) resource sets in accordance with an example of the present disclosure.

More specifically, as shown in FIG. 3, two different TA values are configured to UE A: the transmission of the first UL PRS resource/resource set follows the first TA value T1 resulting in UE transmission slot 300 and gNB reception slot 302, and the transmission of the second UL PRS resource/resource set follows the second TA value T2 resulting in UE transmission slot 304 and gNB reception slot 306. However, it should be noted two TA values is only an example and more TA values can be configured, e.g. up to K and K can be in the range of [1, 32]. Furthermore, in FIG. 3 different TA values are configured in the time domain but such configuration can be extended to the frequency and spatial domains i.e. different TA values can be configured in different sub-bands, and different TA values can be configured in different beams and/or antenna ports.

With respect to the second and third approaches to the configuration of TAs, the TA values may be configured by serving and/or neighboring gNBs using upper layer signaling, e.g. RRC, medium access control (MAC) control element (CE), or downlink control information (DCI).

UL PRS Patterns

As described above, UL PRS in 5G NR are to be based on LTE SRS, where patterns of comb-2 and comb-4 may supported in a non-staggered manner. However, in some cases, such as low SINR cases, non-staggered SRS may result in side correlation peaks that could potentially degrade the positioning performance due to the correlation procedure performed at the receiving gNB and the nature of the UL PRS pseudo random sequence. Consequently, in accordance with present disclosure, UL PRS may be provided in a staggered manner, where semi-persistent or dynamic signaling can be used to indicate if staggering is enabled and such signaling can be conveyed via upper layer signaling, e.g., LPP, RRC, MAC CE or lower layer signaling, e.g., DCI.

Figure 4:
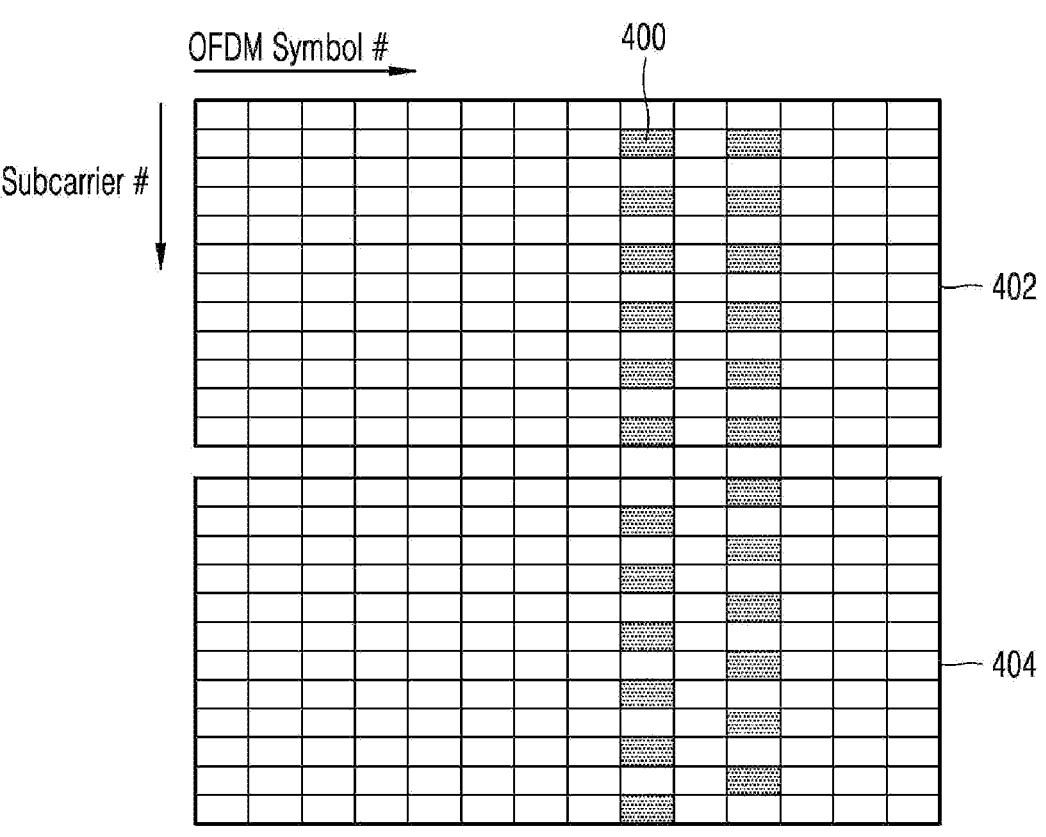
FIG. 4 illustrates transmission patterns of UL PRS in accordance with an example of the present disclosure.

FIG. 4 illustrates transmission patterns of UL PRS in accordance with an example of the present disclosure.

FIG. 4 provides an example of UL PRS 400 transmitted according to a comb-2 pattern which is not staggered (i.e. normal) 402 and according to a comb-2 pattern which is staggered 404. As can be seen from FIG. 4, the staggered pattern 404 may be transmitted across all of the available subcarriers, whereas the UL PRS of the non-staggered pattern 402 are transmitted on alternate subcarriers and repeated in time on the same subcarriers.

Interference Randomisation

The transmission of UL PRS for reception by one or more neighbouring gNBs may result interference between UE transmissions in the neighbouring cells due to overlapping resource allocations and/or due to the effects differing propagation delays/timing advances. Such effects may be of particular concern when the UL PRS transmissions of a UE are power boosted with respect to other transmissions of the UE. In order to mitigate interfaces of this nature, interference randomisation (IR) may be implemented in one or more of the code, frequency and time domains.

In the code domain, IR can be achieved by using different initial seeds based on UE ID, and/or cell ID and/or scrambling ID for UL PRS sequence generation. In the frequency domain, it can be achieved by coordinated scheduling across multiple gNBs. With respect to IR in the time domain, a number of approaches are set out below and illustrated by FIG. 5.

Figure 5:
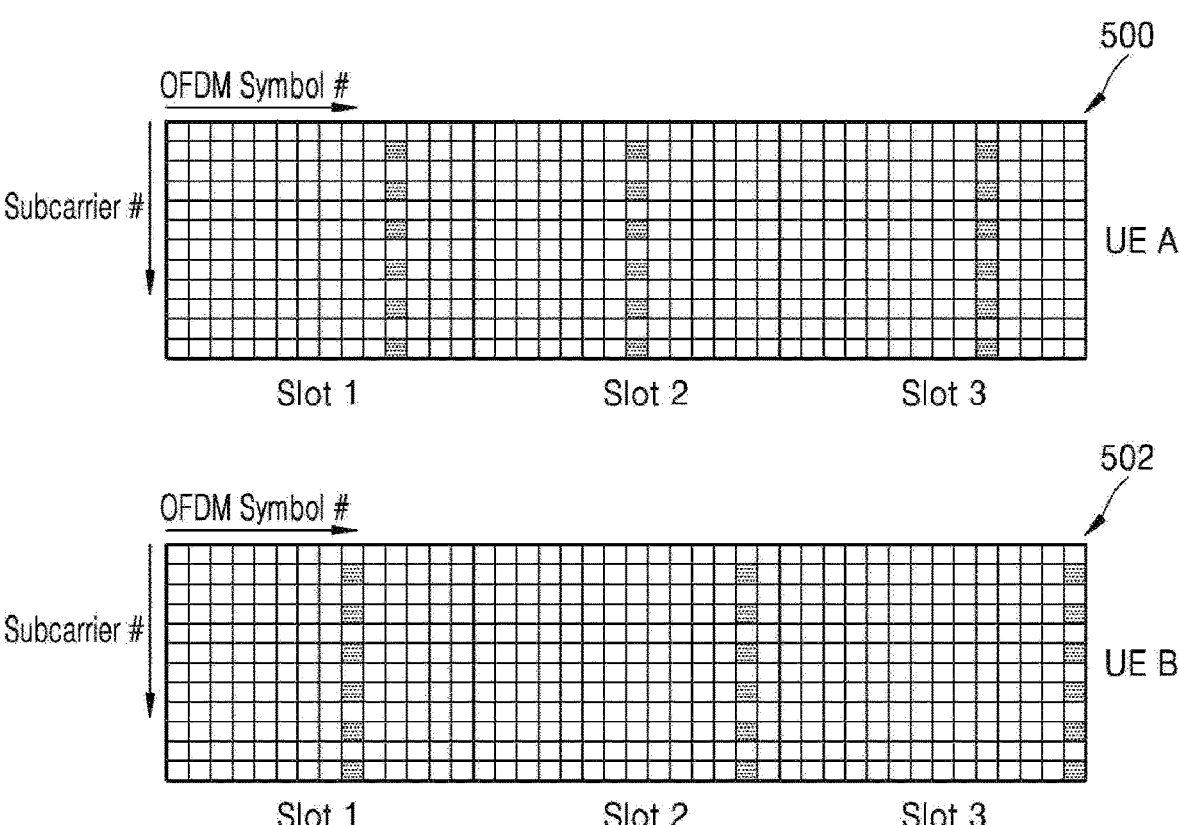
FIG. 5 illustrates distributions of UL PRS in the time domain in accordance with an example of the present disclosure.

FIG. 5 illustrates distributions of UL PRS in the time domain in accordance with an example of the present disclosure;

In current 5G NR proposals, UL PRS may be configured in the last 6 symbols of a slot; however, variation within these slots is unlikely to be sufficient to provide reasonable IR. Therefore, in accordance with an approach of the present disclosure, the potential locations of the UL PRS is extended beyond the last 6 symbols of a slot to K symbols (i.e. k>6).

The location of UL PRS in the k available symbols may then be determined on a pseudo random basis. For example, a pseudo random sequence of which every L bits for example will be used to determine the location of the SRS using a mod operation may be used to provide the pseudo random basis, where the pseudo random sequence is based upon a UE ID or other ID for instance, by virtue of the pseudo random sequence being generated based on a UE ID and/or a cell ID and/or a PRS resource/resource set ID. For example, if K=8 and L=3 and a pseudo sequence "100001011" is used, the location of the UL PRS in the last k symbols of slots 1, 2 and 3 can be determined as mod ("100",8)=4, mod("001",8)=1, mod("011",8)=3 for UE A, where this is shown by 500 in FIG. 5. Likewise, for UE B another pseudo random sequence "010110111" may be used and the UL PRS locations are 2, 6 and 7, where this is shown by 502 in FIG. 5. By following such a random time domain distribution, the likelihood of UL PRS collisions may be reduced and also interference more generally randomized, thus potentially reducing the severity of the interference in neighboring cells caused by the UL PRS transmission.

Although the time domain IR has been derived from pseudo random sequences in the foregoing examples, numerous other approaches to determining the location of the UL PRS may be taken. For example, the distribution may be chosen from a predefined set of UL PRS patterns, or a different approach to selecting random locations may be used. Independent of the specific approach to the interference randomization, the necessary configurations e.g. the pseudo random sequence, may be configured by the serving gNB using upper layer signaling, e.g. LPP, RRC, MAC CE or lower layer signaling, e.g. DCI.

In another example, power control may be used to reduce interference between UE transmission. In particular, when neighbouring gNBs receive UL PRS from a UE, the neighbouring gNBs can reduce the transmit power of its own associated UEs so the interference from the transmissions of these UEs will be reduced from the perspective of the gNBs intended to receive the UL PRS transmissions from the UE. In some examples, the transmit power may effectively be reduced to zero by muting UEs associated with the neighbouring gNBs, wherein the muting signalling can either be scheduled signalling or explicit signalling using upper layer signalling, e.g., LPP, RRC, MAC CE or lower layer signal-ling, e.g., DCI. Furthermore, the application of power reduction or muting may be determined by the type of positioning request. For example, for positioning requests with a high priority/accuracy requirements such as an emergency posi-tioning request, dynamic muting may be implemented whereas for lower priority requests transmit power may merely be reduced or muting scheduled in the future.

Quasi-Co-Location

In a serving cell, when a UE receives DL PRS it can assume the DL PRS is Quasi-Co-Located (QCLed) with the PDDCH or PDCCH DMRS of the current slot or the last available slot, or SSB, or SSB DMRS if existing in the current slot or in the last available slot. Subsequently, when the UE then transmits UL PRS, it may utilise that same beam configuration as used to receive the DL PRS, PDCCH, or PDCCH DMRS of the current slot or the last available slot, or SSB, or SSB DMRS if existing in the current slot or in the last available slot. Two antenna ports or the references transmitted from two antenna ports are said to be quasi co-located (QCLed) if properties of the channel over which a symbol on one antenna port is conveyed can be inferred from the channel over which a symbol on the other antenna port is conveyed.

With respect to neighbouring cells, when a UE receives DL PRS, it can assume DL PRS is QCLed with SSB/CSI-RS for RRM configured in the current slot or the last available slot. If the UE then transmits UL PRS, it can assume the same beam when receiving DL PRS from neighboring cells or SSB/CSI-RS for RRM configured in the current slot or the last available slot.

It may also be necessary to take into account beam sweeping when making the QCLed assumptions since DL PRS may be received using beam sweeping. In particular, the following options may be required to be taken into account DL PRS are assumed to be QCLed within each DL PRS block sub-set DL PRS with the same index in different DL PRS block sub-set are assumed to be QCLed For the first alternative, a UE can do reception beam sweeping within each DL PRS block sub-set. For the second alternative, UE can do reception beam sweeping across different DL PRS block sub-sets. It should also be noted the same principle can be applied to UL beam sweeping.

gNB Cooperation

As described above, UTDOA is reliant on UL PRS of a UE being received by both the serving gNB and also one or more neighbouring gNBs. The UL PRS configuration will be known to the serving gNB since it will likely have per-formed the initial configuration and/or signalling of the UL PRS configuration to the UE. However, the neighbouring gNBs will not have knowledge of the UL PRS configuration of a neighbouring gNB during conventional operation. Con-sequently, in accordance with an example of the present disclosure, in order to allow neighbouring gNBs to deter-mine when to measure/receive UL PRS, the configuration of UL PRS from a serving gNB provided to neighbouring gNBs, via the X2 interface for example. More generally, neighbouring gNBs, and possible also gNBs which are in close proximity but not direct neighbours, may exchange their UL PRS configurations so that each gNBs may effec-tively receive the UL PRS transmitted by UEs of each cell served by the gNBs. Depending on the nature of the UL PRS transmissions i.e. are dynamic, semi-persistent or persistent, the information exchange may take place regular intervals/ set times and/or in response to the dynamic scheduling of UL PRS transmissions. In addition to configuration infor-mation, measurement information related to the reception of PRACH and UL PRS may also be exchanged between the gNBs via the X2 interface such that the UL PRS configu-ration can be determined and the positioning determination performed.

Beam Alignment

When preforming UL positioning, in order to achieve high positioning accuracy it is desirable that the UL PRS transmitted by the UE are received by as many gNBs as possible, and that the quality of the received signal is as high as possible. However, in 5G NR, transmissions are likely to be directional due to the extensive use of beamforming and higher transmission frequencies. Consequently, the use of beamforming when transmitting UL PRS should be consid-ered.

If the transmission pattern of the UL PRS being trans-mitted by the transmitting UE is omnidirectional, it may not be required to take specific account of the beam directions since gNBs in all directions should be able to receive the UL PRS transmission. However, if the UL PRS is beamformed, especially in the higher frequency FR2 where the beam can be relatively narrow, the direction of the beam(s) used to transmit the UL PRS will be required to be taken into account so that sufficient gNBs can receive the UL PRS and the UL PRS are received with a sufficient quality.

Control of the beam directions for UL PRS can be achieved by the UL beam management in the current NR specifications to tune the UL beam direction towards a gNB. However, UL beam management is only applied to the serving gNB, whereas for positioning, such beam direction tuning should also be applied to the neighbouring gNBs. Consequently, there is need for a beam management approach that enables beam directions of UL PRS transmissions to be set relative one or more neighbouring gNBs.

A first approach towards performing UL PRS beamforming in accordance with the present disclosure is to perform beam sweeping at the UE side. In particular, the UE may be configured to transmit its UL PRS in every direction so that the UL PRS transmission pattern is quasi omnidirectional, thus hopefully insuring that the UL PRS can be heard by gNBs is all directions. However, the UL PRS configuration required to achieve this and also the TA and power control required as part of such beam sweeping is required to be considered.

With respect to UL PRS configuration including beam sweeping, UL PRS needs to be configured with different beam directions in one sweeping cycle e.g. K beam directions in the range of [1, 64]. In a first approach, one UL PRS resource or multiple UL PRS resources may be configured with the same beam pattern, where, in the latter case, it can be realized by UL PRS repetition. A second approach is to configure one beam direction for one UL PRS resource set or multiple resource sets if the UL PRS transmission power can be accumulated to improve the hearability.

With respect to TA and power control, since UL PRS can be received by gNBs at different distances from the UE, when UL PRS are transmitted with different beam directions, independent TA and power control may be configured for different beams to assist with the UL PRS transmitted in each direction being transmitted at an appropriate power.

Figure 6A:
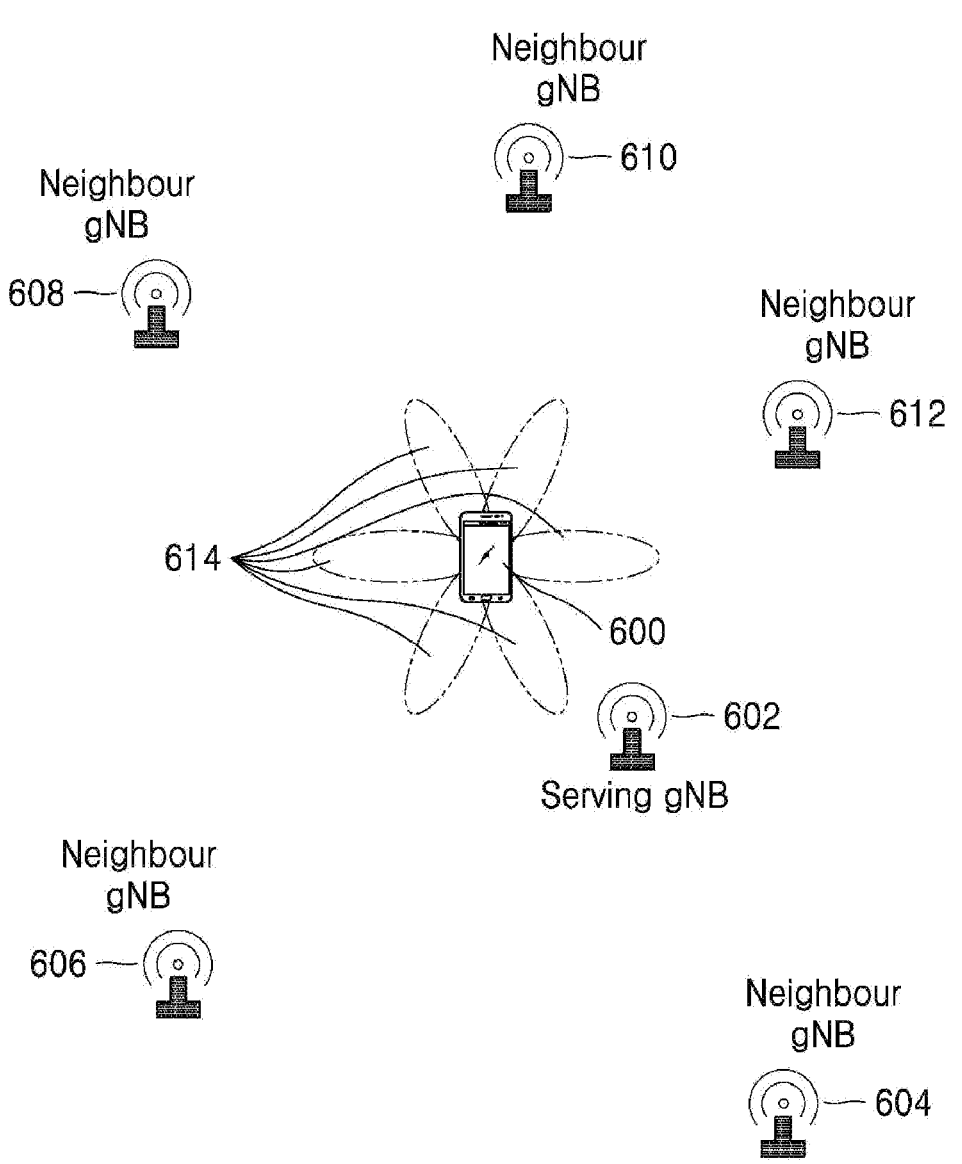
FIG. 6A illustrates a UE performing UL PRS transmission using beam sweeping in accordance with an example of the present disclosure.

FIG. 6A illustrates the use of beam sweeping to achieve a quasi-omnidirectional transmission pattern for UL PRS transmission. In particular, in addition to transmitting the UL PRS using a beam directed towards the serving gNB 602, the UE 600 transmits in substantially all the K available beam directions 614, where in the case of FIG. 6, K=6 and the beam directions 614 are shown by the shaded areas, so that the neighbouring gNBs 604, 606, 608, 610, 612 in all directions may receive the UL PRS. Subsequently, in some examples, the identity of beams that result in the strongest reception of the various gNBs may be exchanged between the receiving gNBs and signalled to the UE by the serving gNB so that the UE may subsequently transmit the UL PRS only using the signalled subset of beams. Alternatively, the UE may continue to transmit in all directions without feedback from the gNBs.

Figure 6B:
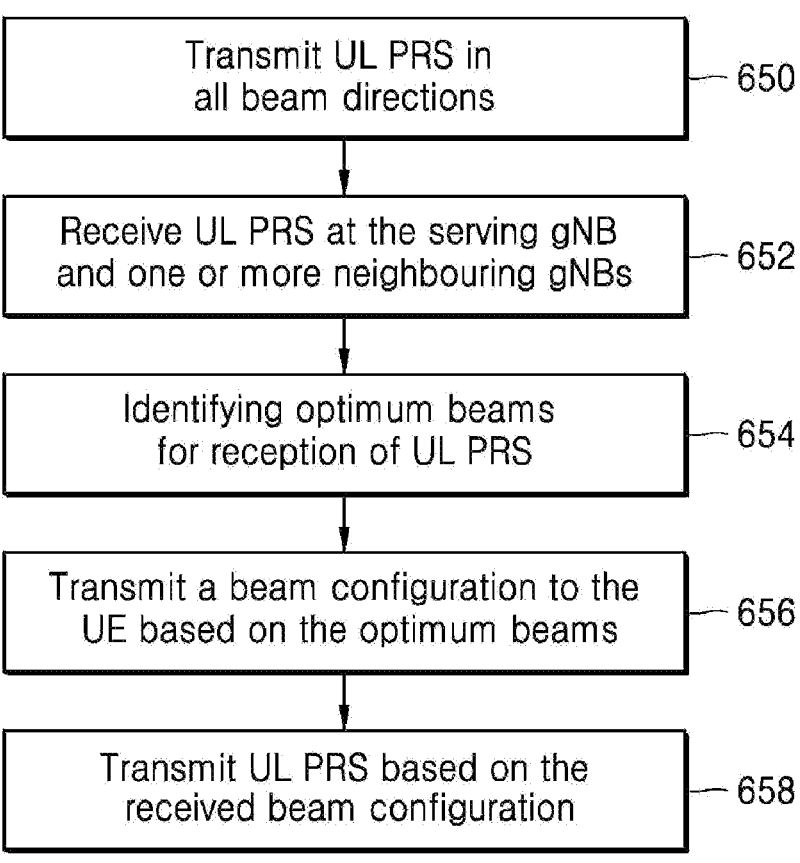
FIG. 6B provides a method for UL PRS transmission using beam selection in accordance with an example of the present disclosure.

FIG. 6B provides a flow diagram of an example approach where beam sweeping is initialled performed and then feedback is provided by one or more gNBs so that particular beams can be selected for the transmission of the UL PRS.

At step 650 the UE transmits UL PRS in all beam directions.

At step 652 the UL PRS are received by the serving gNB and or more neighbouring gNBs.

At step 654 the optimum beams for UL PRS transmission are identified. This identification process may be performed by each receiving gNB and then the resulting information provided to the gNB, and reception information may be provided from each neighbouring gNB and the gNB then performs the full identification itself.

At step 656 the serving gNB transmits the determined beam configuration to the UE.

At step 658 the UE then transmits the UL PRS based on the beam configuration information received from the serving gNB.

An advantage of utilising beam sweeping is that it does not require beam correspondence or any a priori information and is relatively simple to implement. However, it may lead to increased signalling overheads. In addition, it can generate high interference to other UEs and degrade their performance due to the non-selective nature of the beam directions. Furthermore, it is not always the case that all UEs require positioning at the same time. For example, in some cases, only one or a few UEs will require positioning at any given time. In such a case, it may be more efficient if some specific transmission beam directions can be identified so that the UL PRS is only transmitted in those directions to reduce signalling overhead and interference. For example, the K beam directions can be reduced to K/2 or even K/4. In this regard, a second approach to beam management for UL PRS in accordance with the present disclosure in set out below.

It should be noted that the beam sweeping should be flexible in the sense that there may not be a need to transmit to every possible direction but only a subset of possible directions if the UE knows the a direction towards one or more gNBs that may receive the UL PRS.

As a second approach, instead of beam sweeping a UE may use one or multiple specific transmission beams for transmitting the UL PRS to specific gNBs e.g. the serving gNB and one or more neighbouring gNBs, transmission beams may be derived from reception beams when the UE measures the synchronisation signal block (SSB)/channel state information reference signal (CSI-RS) from neighbouring cells during the RRM measurement stage. In particular, the UE compares potential reception beams when receiving SSB/CSI-RS from one neighbouring gNB and then chooses the best reception beam or reception beam group based on a predefined criteria e.g. the beam with the highest reception signal quality, and then when transmitting UL PRS, the UE then uses this reception beam pattern to form the transmission beam for the corresponding neighbouring gNB.

However, high interference may be experienced by the UE when measuring SSB/CSI-RS from neighbouring gNBs, especially for SSB because they are located in the same position in the frequency domain. In such cases, using DL PRS for identifying reception/transmission beams may be a better option because DL PRS may include beam sweeping similar to SSB and DL PRS is expected to have lower interference due to an orthogonal configuration between DL PRSs from different gNBs. In such a case, a UE may compare different reception beams when measuring DL PRS and choose the best reception beam or reception beam group with the highest reception signal quality and then use the same beam pattern for transmission beam when transmitting UL PRS.

Figure 7:
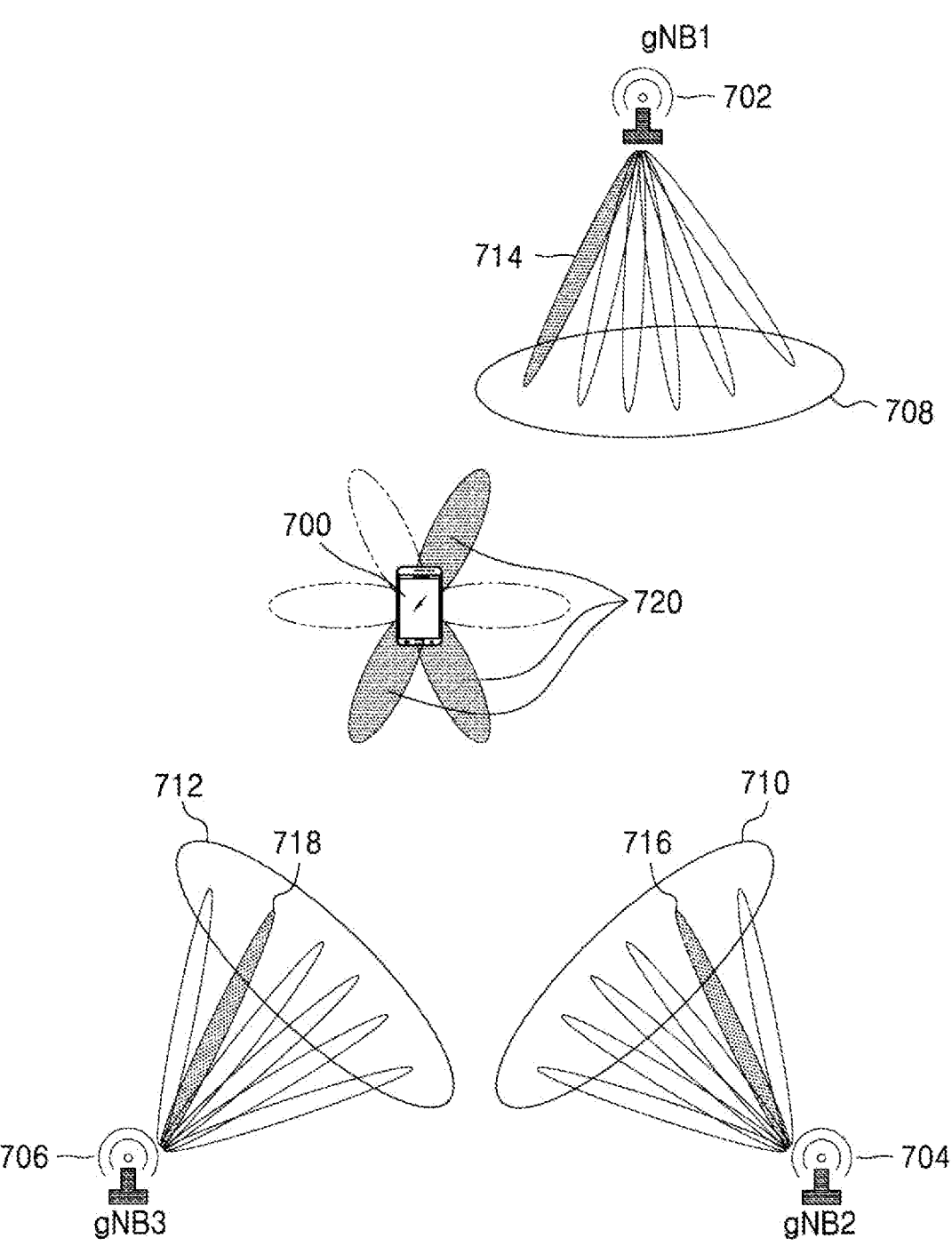
FIG. 7 illustrates a UE performing UL PRS transmission using beam selection in accordance with an example of the present disclosure.

FIG. 7 illustrates the use of beam selection for UL PRS in accordance with this second approach. Each of the three gNBs 702, 704, 706 may transmit to the UE 700 using one or more transmission beams 708 710 712. The UE may then select the reception beam with the highest signal reception quality e.g. 714 from gNB1, 716 from gNB2 and 718 from gNB3, and then form its own UL PRS beam transmission pattern 720 based on selected reception beams.

In addition to generalised procedure set out above for this second approach, the UE may in some examples be required to select which gNBs is wishes to transmit the UL PRS to.

Consequently, the UE may require a list of candidate gNBs that can potentially receive i.e. hear, the UE's UL PRS. Such a list may be formed by measuring a DL signal, e.g. SSB or DL PRS from each gNB. A threshold can then be set and when the reception signal strength is above such threshold, the corresponding gNB may be included in the list. In some examples, multiple different thresholds can be set for SSB and DL PRS due to different interference situations, where these thresholds may be signalled to the UE and UE reports back the list containing the gNBs above such thresholds. Subsequently, when the serving gNB configures UL PRS to the UE, the configuration may be based on this list.

The procedure set out above presumes that there is correspondence between the transmission and reception beams, and thus if there is not such a correspondence e.g. the best transmission beam is different from the best reception beam, performance may be degraded. This issue may be addressed by a UE checking with a relevant gNB that such a correspondence holds. If yes, the gNB can be potentially included in the list, otherwise, it should may not be included. However, it should be noted that even with beam correspondence holding, UE transmission beams need to be configured by the gNB. In such a case, a UE needs to report the best reception beam or beam group back to the gNB and gNB can then configure the transmission beams of UL PRS for each UE.

As a third approach, beam sweeping, and beam selection may combined. In particular, since beam correspondence may not always hold, beam sweeping can be a baseline approach and beam selection can be used an enhancement which is configured when necessary. For example, for beam sweeping, a UE can use wider beams to reduce total number of beam directions to be swept in order to reduce signalling overheads. Then for a beam selection state, a narrower beam can be used for better hearability for one or more specific gNBs.

Furthermore, if only the second approach is implemented, it is possible that a limited number of gNBs are included in the list so that the UL PRS can only be heard by small number of gNBs, thus adversely affecting the positioning accuracy. However, with beam sweeping, UL PRS may be expected to be heard by more gNBs, thus potentially leading to improved positioning accuracy even if the received signal quality might not be as good as using beam selection, since the increased number of gNBs receiving the UL PRS can potentially offset such reduced signal quality.

As part of the third approach, if may be necessary to configure different UL resources for beam sweeping and beam selection, where this may be achieved using either of the examples approaches set out below.

In a first example, two separate resources/resource sets can be configured for the beam sweeping and beam selection, respectively. The resource(s)/resource set configured for beam sweeping may not then be used by beam selection. On the contrary, the resource(s)/resource set configured for beam selection can be used for beam sweeping because its size can be dynamically or semi-statically changed.

In a second example, beam sweeping and beam selection share the same resource set and the serving gNB needs to configure dynamically or semi-statically which resource(s) in the resource set are used for beam sweeping and the rest of the resource(s) may be used for beam selection or the other way around.

Figure 8:
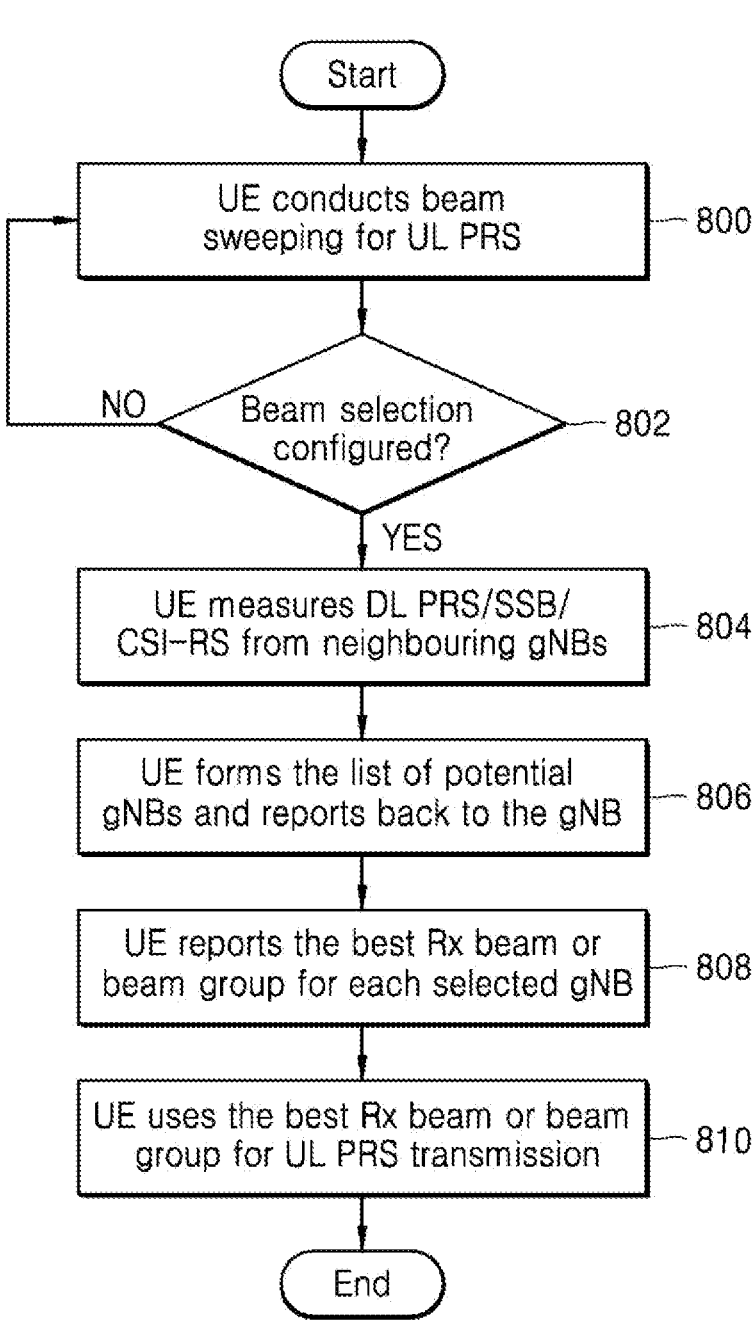
FIG. 8 provides a method for UL PRS transmission using hybrid beam sweeping and beam selection in accordance with an example of the present disclosure.

FIG. 8 provides a flow chart of an example implementation of the third approach.

In another approach, both the serving and neighbour gNBs can be assumed to have some form of a priori information from the past transmission of UL PRS or other reference signals, e.g., PRACH. The gNBs can signal the UE to use the transmission beam QCLed with these reference signals or at least use such transmission beam as a starting point for beam sweeping.

Once the UE positioning process has started, at step 800 the UE conducts beam sweeping for UL PRS.

At step 802 it is determined in a beam selection has been configured. If a beam selection has not been configured, the UE may repeat the beam sweeping. If a beam selection has been configured, the UE proceeds to step 804.

At step 804 the UE measures DL PRS/SSB/CSI-RS from received from neighbouring gNBs.

At step 806 the UE forms a list of potential gNBs and reports back to the gNB.

At step 808 the UE reports the best reception beam or beam group for each selected gNB.

At step 810 the UE uses the best reception beam or beam group for UL PRS transmissions.

In the first to third approaches discussed above, the transmission beam is derived from a reception beam by the UE; however, in accordance with a fourth approach, the transmission beam can be decided by the gNB when receiving PRACH. In particular, when the UE transmits PRACH, it can also use beamforming for each PRACH preamble. Subsequently, both the serving gNBs and the neighbour gNBs can measure the signal quality of PRACH and choose the best PRACH transmission beam or beam group, and when the UE transmits UL PRS, the gNB can configure the UE to use the same beam or beam group.

It should be noted that even though the above solutions are for UL PRS, the same idea can also be used for DL where UL PRS is replaced by DL PRS and SSB/DL PRS/CSI-RS is replaced by PRACH/UL PRS/SRS.

Figure 9:
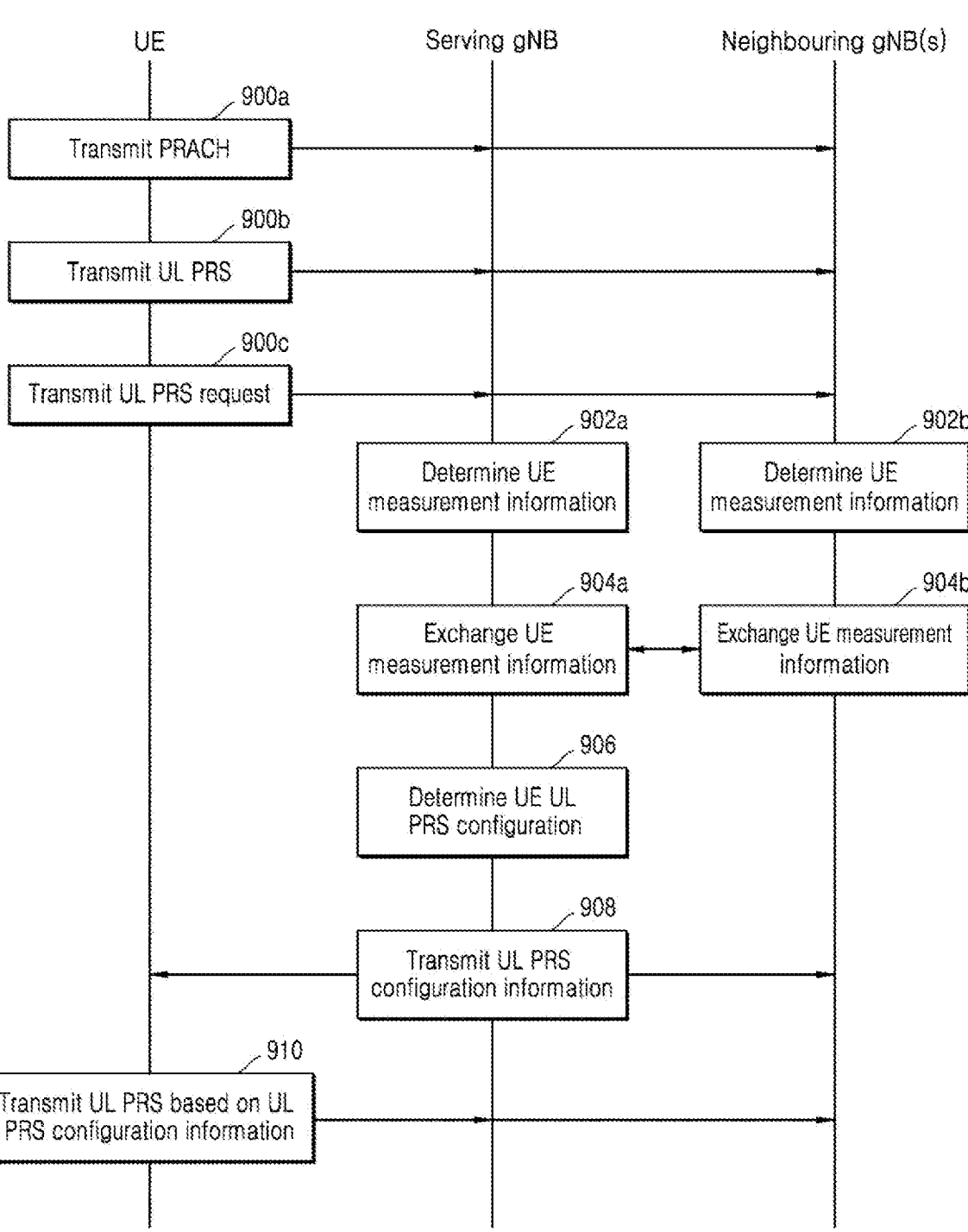
FIG. 9 provides a signal transmission diagram of a 5G NR mobile communications system implementing UL PRS configuration in accordance with an example of the present disclosure.

FIG. 9 provides an illustration of the example transmissions that may take place between a UE, the serving gNB and one or more neighbouring gNBs in accordance with one or more of the approaches for UL PRS enhancement described above.

Initially, the serving gNB and one or more neighbouring gNBs may be made aware of a UE or a request for positioning by UE by one or more of a PRACH transmission 900a, the transmission of UL PRS 900b according to semi-persistent scheduling for example, or a transmission of a request for UL PRS transmission 900c. However, steps 900a to 900c are not exhaustive and other approaches to identifying a UE requiring positioning or performing UL PRS transmissions may be used or otherwise receiving information that enables UL PRS enhancement to take place may be used. For example, the transmission of UL PRS 900b may be that described with reference to FIG. 6B i.e. beam sweeping in all directions before selection of individual beams takes place.

At steps 902a and 902b the serving gNB and, if required, one or more neighbouring gNBs may determine one or measurements concerning the UE. For example, propagation delays associated with each gNB, optimum reception beams etc. may be determined. This step may also include determining the nature of the UL PRS, for example the priority of the positioning request.

At step 904, information concerning the UE and possible gNB specific configuration information is exchanged between the gNBs. For example, the various propagation delays between the UE and the gNBs or beam forming measurements may be exchanged. Although the exchange is shown to be bi-directional in FIG. 9, it may also be one way from the neighbouring gNBs to the serving gNB.

At step 906 the serving gNB determines the required configuration for the UE UL PRS transmissions. For example, the serving gNB may determine UL PRS configurations in accordance with any one of the approaches described in this disclosure, where the configuration may include one or more of timing advances, interference randomisation criteria, beam alignment information, UL PRS transmission patterns etc. In addition to UE configurations, the serving gNB may also determine configurations for the neighbouring gNBs such as measurement windows or timing advances for example. Alternatively, the configuration determination may be performed at both the serving gNB and one or more of the neighbouring gNBs.

Once the determination of the UE UL PRS configuration has been performed, the information on the determination configuration may then be transmitted to the UE via higher and/or lower layer signalling and one or more neighbouring gNBs via an X2 interface for example if they require such information to receive the UL PRS that are to be transmitted in accordance with the determined configuration.

At step 910, after reception of the UL PRS configuration information, the UE may then transmit UL PRS in accordance with the configuration information to the serving gNB and one or more neighbouring gNBs. The gNBs may then determine the position of the UE based on the received UL PRS.

Although the steps of FIG. 9 have been illustrated in a particular order, some of the step may be performed in a different and/or omitted in some implementations. For example, if resources for UL PRS transmissions are semi-persistently scheduled, steps 900a to 900c may not take place in relation to UL PRS configuration, and the PRS configuration information may be provided to the UE and neighbouring gNBs prior to any request for positioning. Alternatively, UL PRS configuration from previous transmissions may be used if it can be assumed to be valid, or used as an initial transmission configuration until a new configuration is determined and/or signalled to the UE. Furthermore, additional steps may also be included, for example to implement the method illustrated in FIG. 8.

Although the various approaches to UL PRS/SRS enhancements have been described individually, it should be noted that they may be implemented simultaneously in order to address the different but possibly coexisting issues that may arise as a result of the use of UL PRS in a 5G NR system. For example, the approaches to TA configuration may be implemented along with the approaches to beam alignment. Likewise, for example, the approaches to interference randomisation may be implemented along with the various approaches to beam alignment.

Figure 10:
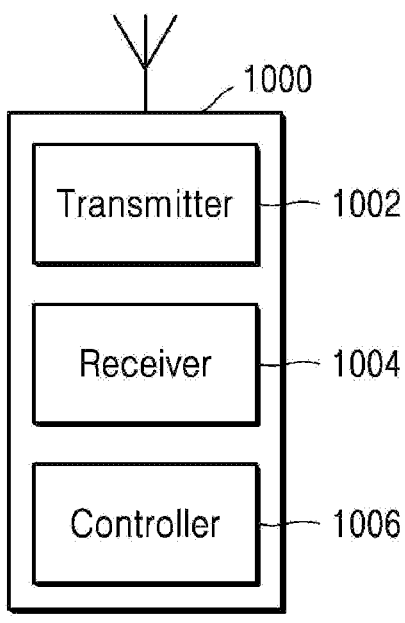
FIG. 10 provides a schematic diagram of a UE in accordance with an example of the present disclosure.

FIG. 10 provides a schematic diagram of the structure of a gNB 1000 which is arranged to operate in accordance with any of the examples described above.

The gNB 1000 may be serving gNB or a neighbouring gNB and includes a transmitter 1002 arranged to transmit signals to a UE; a receiver 1004 arranged to receive signals from a UE; and a controller 1006 arranged to control the transmitter and receiver and to perform processing such as in accordance with the above described methods, and also to communicate with the core network and neighbouring gNBs.

Figure 11:
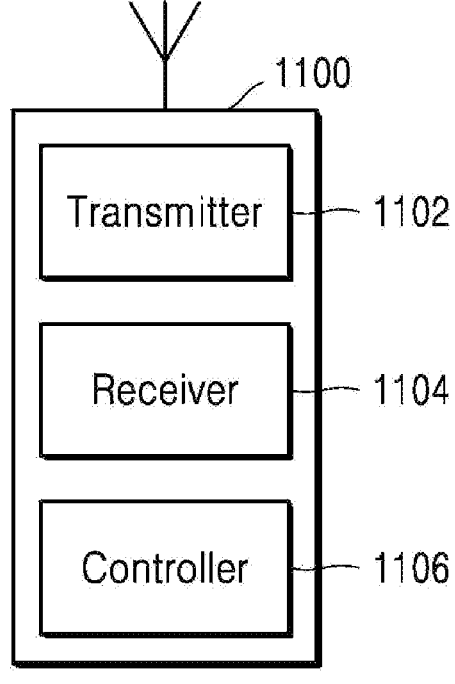
FIG. 11 provides a schematic diagram of a gNB in accordance with an example of the present disclosure.

FIG. 11 provides a schematic diagram of the structure of a UE 1100 which is arranged to operate in accordance with any of the examples of the present disclosure described above.

The UE 1100 includes a transmitter 1102 arranged to transmit signals to one or more gNBs; a receiver 1104 arranged to receive signals from one or more gNBs; and a controller 1106 arranged to control the transmitter and receiver and to perform processing in accordance with the above described methods.

Although in FIGS. 10 and 11 the transmitter, receiver, and controller have been illustrated as separate elements, any single element or plurality of elements which provide equivalent functionality may be used to implement the examples of the present disclosure described above.

Figure 12:
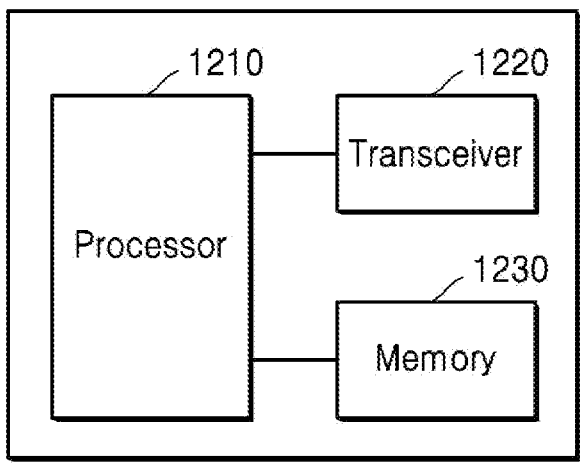
FIG. 12 schematically illustrates the base station according to embodiments of the present disclosure.

FIG. 12 schematically illustrates the base station according to embodiments of the present disclosure.

Referring to the FIG. 12, the Base station 1200 may include a processor 1210, a transceiver 1220 and a memory 1230. However, all of the illustrated components are not essential. The Base station 1200 may be implemented by more or less components than those illustrated in FIG. 12. In addition, the processor 1210 and the transceiver 1220 and the memory 1230 may be implemented as a single chip according to another embodiment.

The Base station 1200 may be serving gNB or a neighbouring gNB. The gNB 1000 described above may correspond to the base station 1200. The transmitter 1002 and the receiver 1004 may correspond to the transceiver 1220. The controller 1006 described above may correspond to the processor 1210.

The aforementioned components will now be described in detail.

The processor 1210 may include one or more processors or other processing devices that control the proposed function, process, and/or method. Operation of the Base station 1200 may be implemented by the processor 1210.

The transceiver 1220 may include a RF transmitter for up-converting and amplifying a transmitted signal, and a RF receiver for down-converting a frequency of a received signal. However, according to another embodiment, the transceiver 1220 may be implemented by more or less components than those illustrated in components.

The transceiver 1220 may be connected to the processor 1210 and transmit and/or receive a signal. The signal may include control information and data. In addition, the transceiver 1220 may receive the signal through a wireless channel and output the signal to the processor 1210. The transceiver 1220 may transmit a signal output from the processor 1210 through the wireless channel.

The memory 1230 may store the control information or the data included in a signal obtained by the Base station 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

Figure 13:
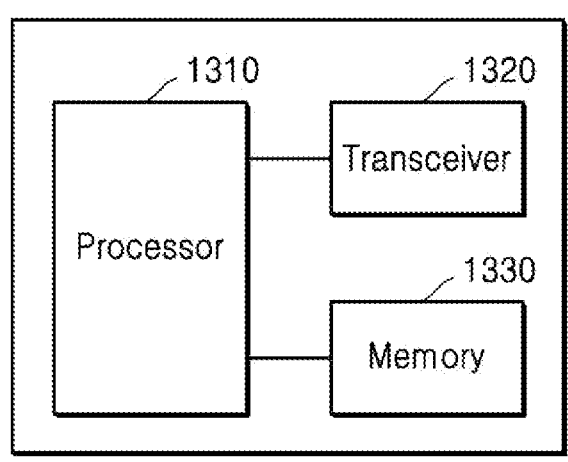
FIG. 13 illustrates a user equipment (UE) according to embodiments of the present disclosure.

FIG. 13 illustrates a user equipment (UE) according to embodiments of the present disclosure.

Referring to the FIG. 13, the UE 1300 may include a processor 1310, a transceiver 1320 and a memory 1330. However, all of the illustrated components are not essential. The UE 1300 may be implemented by more or less components than those illustrated in FIG. 13. In addition, the processor 1310 and the transceiver 1320 and the memory 1330 may be implemented as a single chip according to another embodiment.

The UE 1100 described above may correspond to the UE 1300. The transmitter 1102 and the receiver 1104 may correspond to the transceiver 1320. The controller 1106 described above may correspond to the processor 1310.

The aforementioned components will now be described in detail.

The processor 1310 may include one or more processors or other processing devices that control the proposed function, process, and/or method. Operation of the UE 1300 may be implemented by the processor 1310.

The transceiver 1320 may include a RF transmitter for up-converting and amplifying a transmitted signal, and a RF receiver for down-converting a frequency of a received signal. However, according to another embodiment, the transceiver 1320 may be implemented by more or less components than those illustrated in components.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the UE 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the present disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. Examples of the present disclosure extend to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present disclosure may also be implemented via computer executable instructions stored on a computer readable storage medium, such that when executed cause a computer to operate in accordance with any other the aforementioned embodiments.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the invention, which is defined in the accompanying claims.

The invention claimed is:

1. A method of a user equipment (UE) in wireless communication system, the method comprising:

receiving, from a base station, configuration information on an uplink reference signal for positioning, wherein the configuration information on the uplink reference signal for positioning includes (i) information related to a spatial relation of the uplink reference signal for positioning and (ii) information related to a symbol location of a resource of the uplink reference signal for positioning within a slot, and wherein the information related to the symbol location of the resource of the uplink reference signal for positioning within the slot included in the configuration information on the uplink reference signal for positioning indicates a resource occupying beyond last 6 symbols within the slot; and based on (i) the information related to the spatial relation of the uplink reference signal for positioning (ii) the information related to the symbol location of the resource of the uplink reference signal for positioning within the slot, transmitting, to the base station, the uplink reference signal for positioning on the resource occupying beyond last 6 symbols with the slot.

2. The method of claim 1, wherein the uplink reference signal for positioning is transmitted with same spatial configuration used for a reception of a reference RS, and wherein the reference RS includes at least one of a synchronization signal block (SSB), a channel state information-reference signal (CSI-RS), or a downlink-positioning reference signal (DL-PRS).

3. The method of claim 2, wherein the SSB and the DL-PRS are configured on a neighbor cell.

4. The method of claim 1, wherein a transmission of the uplink reference signal for positioning is performed based on one of a periodic transmission, a semipersistent transmission, or an aperiodic transmission.

5. The method of claim 1, wherein the configuration information on the uplink reference signal for positioning further includes information for a timing advance, wherein the information for the timing advance is identified based on information for a propagation delay between the UE and a plurality of base stations including the at least one neighboring base station and the base station, and wherein the information for the timing advance corresponds to one of:

a maximum value of the propagation delays between the UE and the plurality of base stations, an average value of the propagation delays between the UE and the plurality of base stations, or a weighted average value of the propagation delays between the UE and the plurality of base stations.

6. The method of claim 1, wherein the configuration information on the uplink reference signal for positioning further includes information for a transmission pattern of the uplink reference signal for positioning, wherein the information for the transmission pattern includes a staggered comb pattern, and wherein the uplink reference signal for positioning is transmitted on entire subcarriers of available resources of the uplink reference signal for positioning based on the information for the transmission pattern of the uplink reference signal for positioning.

7. The method of claim 1, wherein the configuration information on the uplink reference signal for positioning further includes beamforming alignment information for the uplink reference signal for positioning, and wherein the uplink reference signal is transmitted using a beam-sweeping across multiple resources based on the beamforming alignment information for the uplink reference signal for positioning.

8. The method of claim 1, further comprising:

identifying at least one beam alignment configuration for a downlink-positioning reference signal (DL-PRS), wherein the DL-PRS is configured to be quasi co-located (QCLed) with a downlink reference signal, and wherein the downlink reference signal includes at least one of: the synchronization signal block (SSB) or the channel state information-reference signal (CSI-RS).

9. The method of claim 1, wherein the uplink reference signal for positioning is transmitted with different transmit powers on a plurality of beams.

10. The method of claim 1, wherein the uplink reference signal for positioning includes a sounding reference signal (SRS).

11. A user equipment (UE) in wireless communication system, the UE comprising:

a transceiver;

memory storing one or more instructions, and at least one processor operably coupled to the transceiver and the memory, the at least one processor configured to execute the one or more instructions to:

receive, from a base station, configuration information on an uplink reference signal for positioning, wherein the configuration information on the uplink reference signal for positioning includes (i) information related to a spatial relation of the uplink reference signal for positioning and (ii) information related to a symbol location of a resource of the uplink reference signal for positioning within a slot, and wherein the information related to the symbol location of the resource of the uplink reference signal for positioning within the slot included in the configuration information on the uplink reference signal for positioning indicates a resource occupying beyond last 6 symbols within the slot; and based on (i) the information related to the spatial relation of the uplink reference signal for positioning and (ii) information related to a symbol location of the resource of the uplink reference signal for positioning within a slot, transmit, to the base station, the uplink reference signal for positioning on the resource occupying beyond last 6 symbols within the slot.

12. The UE of claim 11, wherein the uplink reference signal for positioning is transmitted with same spatial configuration used for a reception of a reference RS, and wherein the reference RS includes at least one of a synchronization signal block (SSB), a channel state information-reference signal (CSI-RS), or a downlink-positioning reference signal (DL-PRS).

13. The UE of claim 12, wherein the SSB and the DL-PRS are configured on a neighbor cell.

14. The UE of claim 10, wherein a transmission of the uplink reference signal for positioning is performed based on one of a periodic transmission, a semipersistent transmission, or an aperiodic transmission.

15. The UE of claim 11, wherein the uplink reference signal for positioning includes a sounding reference signal (SRS).

16. A method of a base station in wireless communication system, the method comprising:

transmitting, to a user equipment (UE), configuration information on an uplink reference signal for positioning, wherein the configuration information on the uplink reference signal for positioning includes (i) information related to a spatial relation of the uplink reference signal for positioning and (ii) information related to a symbol location of a resource of the uplink reference signal for positioning within a slot, and wherein the information related to the symbol location of the resource of the uplink reference signal for positioning within the slot included in the configuration information on the uplink reference signal for positioning indicates a resource occupying beyond last 6 symbols within the slot; and based on (i) the information related to the spatial relation between the reference RS and the uplink reference signal for positioning and (ii) information related to a symbol location of the resource of the uplink reference signal for positioning within a slot, receiving, from the UE, the uplink reference signal for positioning on the resource occupying beyond last 6 symbols within the slot.

17. The method of claim 16, wherein the uplink reference signal for positioning includes a sounding reference signal (SRS).

18. A base station in wireless communication system, the base station comprising:

transceiver;

memory storing one or more instructions; and at least one processor operably coupled to the transceiver and the memory, the at least one processor configured to execute the one or more instructions to:

transmit, to a user equipment (UE), configuration information on an uplink reference signal for positioning, wherein the configuration information on the uplink reference signal for positioning includes (i) information related to a spatial relation of the uplink reference signal for positioning and (ii) information related to a symbol location of a resource of the uplink reference signal for positioning within a slot, and wherein the information related to the symbol location of the resource of the uplink reference signal for positioning within the slot included in the configuration information on the uplink reference signal for positioning indicates a resource occupying beyond last 6 symbols within the slot; and based on (i) the information related to the spatial relation of the uplink reference signal for positioning and (ii) information related to a symbol location of the resource of the uplink reference signal for positioning within a slot, receive, from the UE, the uplink reference signal for positioning on the resource occupying beyond last 6 symbols within the slot.

19. The base station of claim 18, wherein the uplink reference signal for positioning includes a sounding reference signal (SRS).

\* \* \* \* \*